May 8, 1934.  E. W. MENNINGER  1,957,467

SPACER NAIL

Filed Aug. 5, 1931

INVENTOR,

Elmore William Menninger.

Patented May 8, 1934

1,957,467

UNITED STATES PATENT OFFICE 1,957,467

SPACER NAIL

Elmore William Menninger, Los Angeles, Calif.

Application August 5, 1931, Serial No. 555,217

14 Claims. (Cl. 72—118)

My invention relates to spacer-nails of staple-like construction and employed for securing reenforcement foundations, embodying a reticulated element for cementitious material, to position on a support. The present invention is an improvement or modification of the spacer-nails as disclosed in my Letters Patent for Furring construction, No. 1,816,387, dated July 28, 1931.

In my aforesaid Letters Patent, the spacer-nails there shown are staple-like in shape and each is formed having the oppositely disposed portions thereof of unequal lengths, but the shorter shank is blunt and alone limits the depth the longer shank may penetrate the support, when the member is driven therein.

In my present invention, the spacer-nails, besides having oppositely disposed portions as in staples and which are rigid, are provided with immovable means intermediate on a pointed drive, that will limit the depth the spacer-nails may penetrate the support, when driven therein, and thus, the spacer-nails will project a predetermined distance from the support, and the reticulated element, to be engaged by the spacer-nails, will neither be crushed or sheared nor forced too closely against the member adjacent to which it extends.

An object of my invention is in making provision for securing a backing material, as may be employed with reenforcement foundations, against the support, and retaining the reticulated element spaced from said backing material and the support, so that the cementitious material may completely enclose the reticulated element, when applied thereto.

Another object is to provide a construction that will grip the reticulated element between the oppositely disposed portions of the spacer-nails and retain such engagement.

A further object is to provide a construction that, while limiting the penetration of the spacer-nails into the support, will also seal the apertures made by the spacer-nails in the backing material, when this is used.

My present invention possesses, besides the provision of constructing immovable means intermediate on the spacer-nails to limit the depth the member may penetrate the support, the advantage of having no separate or sliding members or moving portions whereby the reticulated element is retained, and, consequently, the desirability of inexpensive manufacture and facility of application, as well as a construction making for perfect enclosure of the reticulated element within the cementitious material.

These and other features of my invention will appear in the following description of the preferred constructions illustrated in the drawing relating thereto, but the invention is not to be construed as being restricted to the precise showing, since various adaptations of construction and employment are possible within the range of the invention as set out in the claims hereto appended:

The accompanying drawing illustrates the invention, wherein—

Figure 1:
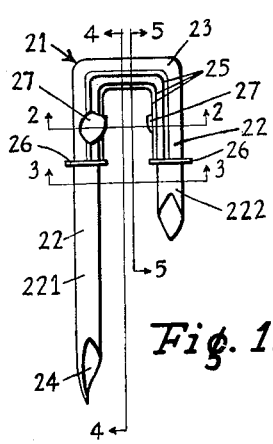
Fig. 1 is a side elevation of a spacer-nail embodying the invention and shows the oppositely disposed portions or shanks thereof.

In the drawing, corresponding reference characters indicate the elements of equivalent functions, the numeral 21, from which leaders point to the heads of the respective spacer-nails illustrated, designating the spacer-nails in general, consisting of oppositely disposed shanks or portions 22 connected together by a connecting portion 23.

The spacer-nails 21, illustrated in the drawing, are constructed having the oppositely disposed portions 22 of unequal lengths, the longer portion 221 being pointed for driving and the shorter portion 222 being of a form to engage the reticulated element in the spacer-nail. Because of the distinctly different functions of the portions 221 and 222, I prefer to designate the longer portion as the "pointed drive shank" and the shorter portion as the "engaging shank".

The pointed drive shank 221 of the spacer-nails 21 is preferably formed with a twisted cutting, such as indicated at 24 in the drawing, that will cause the spacer-nail to rotate when being driven and, besides gripping a portion or strand of the reticulated element between the shanks or portions 22, as illustrated in Figs. 2, 7, 9, 11 and 14 of the drawing, also tension the reticulated element between adjacent spacer-nails.

I further prefer to construct the bight of the spacer-nails 21 illustrated in the drawing with grooves and ridges 25, to enable the spacer-nail to still more effectively prevent the member to be engaged thereby slipping from position.

Now referring more particularly to Figs. 1 to 5 of the drawing, the engaging shank 222 of the spacer-nail 21 there shown is of a length and pointed to penetrate the support wherewith the spacer-nail is to be employed, and thus insure that the spacer-nail will retain the reticulated element, thereby engaged, in the desired position secured to the support, and at the same time avoid any liability of the spacer-nail releasing the engagement. It is obvious that the spacer-nail 21 in Figs. 1 to 5 could be made with the portions or shanks 22 equal in length.

The pointed drive shank 221 and/or the engaging shank 222 of the spacer-nail 21 illustrated in Figs. 1 to 5 of the drawing is provided with immovable means intermediate thereon and comprising an upset portion or projection or shoulder 26, to engage the member into which the spacer-nail is to be driven and limit the depth that the spacer-nail may penetrate the support wherewith it is to be employed, thus predetermining the distance that the spacer-nail will project therefrom. The means 26 also functions to hold a backing material against the support as well as seal the aperture made therein by the spacer-nail when a backing material is used.

Figure 2:
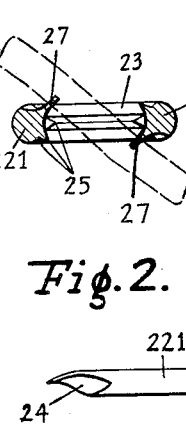
Fig. 2 is an enlarged plan view in section of the spacer-nail, taken on line 2—2, Fig. 1, and shows in broken lines a member engaged in the bight of the spacer-nail.
Figure 3:
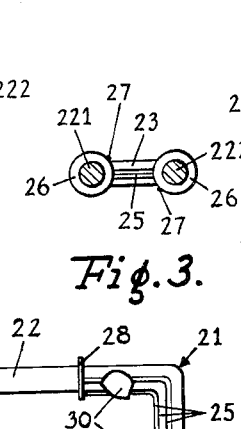
Fig. 3 is a plan view in section of the spacer-nail, taken on line 3—3, Fig. 1.
Figures 4, 5:
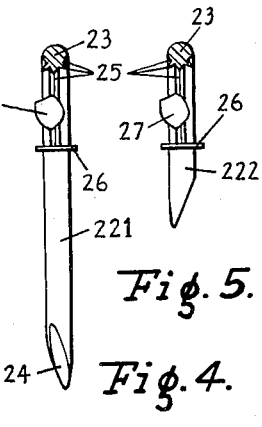
Fig. 4 is an elevation in section of the spacer-nail, taken on line 4—4, Fig. 1.
Fig. 5 is an elevation in section of the spacer-nail, taken on line 5—5, Fig. 1.

In forming the spacer-nails 21, means may be provided on the pointed drive shank 221 and/or the engaging shank 222 to retain the reticulated element spaced from the support, and also from the backing material, when used, and thus permit the cementitious material to completely enclose the reticulated element when applied thereto, which means, in Figs. 1 to 5, is indicated at 27, and comprises a shoulder or projection upset from the body of the spacer-nail to engage beneath a portion or strand of the reticulated element, as illustrated in Fig. 2 of the drawing. If desired, said means 27 may protrude from the spacer-nail 21 at right angles to the direction shown in the drawing or be formed by notching the spacer-nail 21, as hereinafter particularly described.

Figure 6:
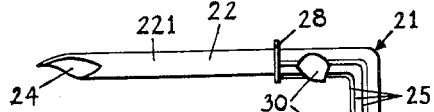
Fig. 6 is a side elevation of a modified construction of the spacer-nail in Figs. 1 to 5.
Figure 7:
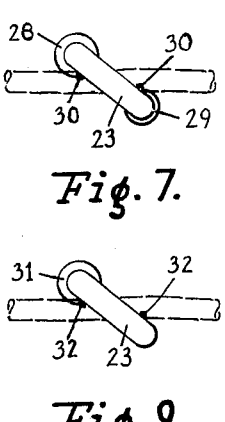
Fig. 7 is a plan view of the spacer-nail in Fig. 6, and shows in broken lines a member engaged in the bight of the spacer-nail.

In Figs. 6 and 7 of the drawing, the engaging shank 222 of the spacer-nail 21 there shown terminates opposite the under-side of the upset portion 28, preferably in an enlarged end or tip, upset from the body of the spacer-nail and convexed if desired, such as indicated at 29 in the drawing. The upset portion 28, in Figs. 6 and 7, functionally corresponds to the means 26, in Figs. 1 to 5, and the projection or shoulder 30, in Figs. 6 and 7, is the same as the means 27, in Figs. 1 to 5.

Figure 8:
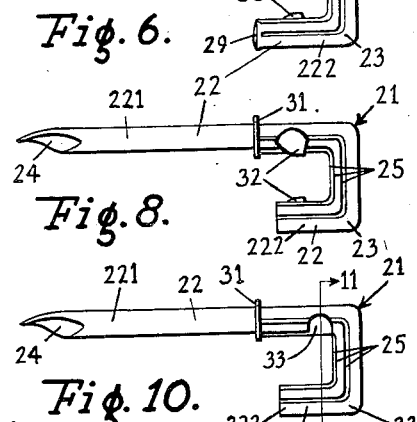
Fig. 8 is a side elevation of a further modification of the spacer-nail in Figs. 1 to 5.
Figure 9:
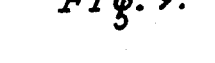
Fig. 9 is a plan view of the spacer-nail in Fig. 8, and shows in broken lines a member engaged in the bight of the spacer-nail.

Referring now particularly to the modifications illustrated in Figs. 8 to 14 of the drawing, the engaging shank 222 is shorter than the length of the pointed drive shank 221 between the portion 23, connecting together the shanks 22, and the under-side of the upset portion 31, shown in the several figures, and, in Figs. 8 to 11, the end or tip of the engaging shank 222 is squared off. Therefore the spacer-nails 21, illustrated in Figs. 8 to 14 of the drawing, while facilitating complete enclosure of the reticulated element, and especially of the engaging shank 222, within the cementitious material, minimize the libility of corrosion, besides effecting a saving of material. The upset portion 31, in Figs. 8 to 14, functionally corresponds to the means 26 and 28, in Figs. 1 to 5 and Figs. 6 and 7, respectively, and the projection or shoulder 32, in Figs. 8 and 9, is the same as the means 27 and 30, in Figs. 1 to 5 and Figs. 6 and 7, respectively.

Figure 11:
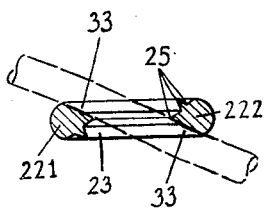
Fig. 11 is an enlarged plan view in section of the spacer-nail, taken on line 11—11, Fig. 10, and shows in broken lines a member engaged in the bight of the spacer-nail.
Figure 10:
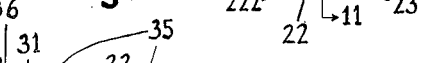
Fig. 10 is a side elevation of another embodiment of the invention.

In the embodiment illustrated in Figs. 10 and 11 of the drawing, the inner-face of the pointed drive shank 221 and/or the inner-face of the engaging shank 222 may be provided with means, comprising, in the instant showing, a depression, constructed to provide a shoulder or projection 33, formed by notching the spacer-nail 21 there shown, and having the corresponding function of the means 27, 30 and 32, in Figs. 1 to 5, Figs. 6 and 7 and Figs. 8 and 9 respectively.

Figure 12:
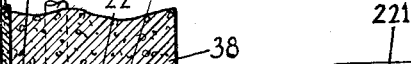
Fig. 12 is a side elevation of a further embodiment of the invention.
Figure 14:
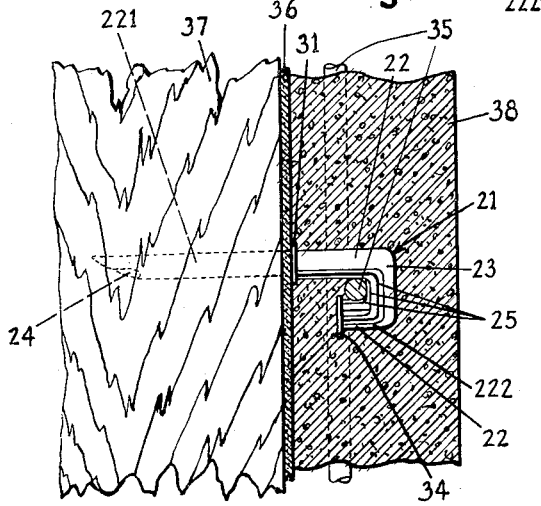
Fig. 14 is a fragmental elevation, showing a reenforcement foundation, in section, engaged by the spacer-nail illustrated in Figs. 12 and 13, in position on a support, with cementitious material, in section, applied to the reenforcement foundation.
Figure 13:
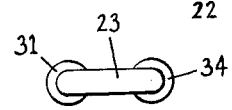
Fig. 13 is a plan view of the spacer-nail in Fig. 12.

In Figs. 12 to 14 of the drawing, the engaging shank 222 of the spacer-nail 21 there shown terminates in an enlargement or projection or shoulder 34, upset from the body of the spacer-nail, and functionally corresponds to the means 27, 30, 32 and 33, respectively illustrated in the drawing at Figs. 1 to 5, Figs. 6 and 7, Figs. 8 and 9 and Figs. 10 and 11, by engaging a portion or strand of the reticulated element in the bight of the spacer-nail, as illustrated in Fig. 14 of the drawing.

In Fig. 14 of the drawing, which clearly shows the manner of using my within described invention, the reticulated element is indicated at 35, the backing material is indicated at 36, the support is indicated at 37, and the applied cementitious material is indicated at 38.

From the foregoing description and accompanying drawing it should be understood that the spacer-nails of my within invention possess such rigidity and simplicity of construction that it is practically impossible for the spacer-nails to yield or change their shape when driven home, and the fact that the immovable means intermediate on a pointed shank for limiting the depth that the spacer-nails may penetrate the support are rigid and substantially in alignment with the head, insures a uniform and positive spacing of the reticulated element at a predetermined distance from the support, and thus, the cementitious material will perfectly enclose the reticulated element, when applied thereto, as illustrated in Fig. 14 of the drawing.

What I claim is:

1. A spacer-nail comprising oppositely disposed and rigid shanks of unequal lengths connected together at the head of the spacer-nail by a connecting portion so as to form a staple-like member, the shanks of the spacer-nail being adapted to penetrate a support, immovable means intermediate on the spacer-nail and substantially in alignment with the head and adapted to limit the penetration of the spacer-nail, and rigid means fixed on the spacer-nail and adapted to retain a portion of a reticulated or other element within the bight of the spacer-nail in spaced relation to the support or other member thereat.

2. A spacer-nail comprising oppositely disposed and rigid shanks connected together at the head of the spacer-nail by a connecting portion so as to form a staple-like member, the shanks of the spacer-nail being adapted to penetrate a support, an immovable projection intermediate on the spacer-nail and substantially in alignment with the head and adapted to limit the penetration of the spacer-nail, and rigid means fixed on the spacer-nail and adapted to retain a portion of a reticulated or other element within the bight of the spacer-nail in spaced relation to the support or other member thereat.

3. A spacer-nail comprising oppositely disposed and rigid portions of unequal lengths connected together at the head of the spacer-nail by a connecting portion so as to form a staple-like member, the spacer-nail being adapted to penetrate a support and the longer portion having a twisted cutting to rotate it when being driven, immovable means intermediate on the spacer-nail and substantially in alignment with the head and adapted to limit the penetration of the spacer-nail, and rigid means fixed on the spacer-nail and adapted to retain a portion of a reticulated or other element within the bight of the spacer-nail in spaced relation to the support or other member thereat.

4. A spacer-nail comprising oppositely disposed and rigid portions connected together at the head of the spacer-nail by a connecting portion so as to form a staple-like member, the spacer-nail being adapted to penetrate a support, an immovable projection intermediate on the spacer-nail and substantially in alignment with the head and adapted to limit the penetration of the spacer-nail, and rigid means fixed on the spacer-nail and adapted to retain a portion of a reticulated or other element within the bight of the spacer-nail in spaced relation to the support or other member thereat.

5. A spacer-nail comprising oppositely disposed and rigid portions connected together by a connecting portion so as to form a staple-like member, the spacer-nail being adapted to penetrate a support and provided with means adapted to limit the penetration and seal the aperture thus made, and rigid means fixed on the spacer-nail and adapted to prevent a reticulated or other element engaged in the bight of the spacer-nail from being moved toward the support or other member thereat.

6. A spacer-nail comprising oppositely disposed and rigid portions connected together at the head of the spacer-nail by a connecting portion so as to form a staple-like member, the spacer-nail being adapted to penetrate a support, immovable means intermediate on the spacer-nail and substantially in alignment with the head and adapted to limit the penetration of the spacer-nail, and grooves and ridges approximately on the inner-face of the spacer-nail and adapted to grip a reticulated or other element when engaged therein, substantially as described.

7. A spacer-nail comprising oppositely disposed and rigid portions of unequal lengths connected together at the head of the spacer-nail by a connecting portion so as to form a staple-like member, the longer portion being substantially in alignment with the head and adapted to penetrate a support and constituting a pointed drive shank, an immovable projection intermediate on the pointed drive shank and adapted to limit the penetration of the spacer-nail, the shorter portion being of a length that it will not penetrate the support or other member thereat, and rigid means fixed on the spacer-nail and adapted to retain a portion of a reticulated or other element within the bight of the spacer-nail in spaced relation to the support or other member thereat.

8. A spacer-nail comprising oppositely disposed and rigid portions of unequal lengths connected together at the head of the spacer-nail by a connecting portion so as to form a staple-like member, the spacer-nail being adapted to penetrate a support and provided with rigid means fixed on the spacer-nail and adapted to retain a portion of a reticulated or other element within the bight of the spacer-nail in spaced relation to the support or other member thereat, and immovable means intermediate on the longer portion and substantially in alignment with the head and adapted to limit the penetration of the spacer-nail.

9. A spacer-nail comprising oppositely disposed and rigid shanks connected together at the head of the spacer-nail by a connecting portion so as to form a staple-like member, one of the shanks being substantially in alignment with the head and adapted to penetrate a support and constituting a pointed drive shank, an immovable projection intermediate on the pointed drive shank and adapted to limit the penetration of the spacer-nail, and the pointed drive shank having a shoulder adapted to retain a portion of a reticulated or other element within the bight of the spacer-nail in spaced relation to the support or other member thereat.

10. A spacer-nail comprising oppositely disposed and rigid portions of unequal lengths connected together at the head of the spacer-nail by a connecting portion so as to form a staple-like member, the longer portion being substantially in alignment with the head and adapted to penetrate a support and constituting a pointed drive shank, immovable means intermediate on the pointed drive shank and adapted to limit the penetration of the spacer-nail, and the shorter portion terminating in an enlargement or shoulder adapted to retain a portion of a reticulated or other element within the bight of the spacer-nail in spaced relation to the support or other member thereat.

11. A spacer-nail comprising oppositely disposed and rigid portions of unequal lengths connected together at the head of the spacer-nail by a connecting portion so as to form a staple-like member the longer portion being substantially in alignment with the head and adapted to penetrate a support and constituting a pointed drive shank, immovable means intermediate on the pointed drive shank and adapted to limit the penetration of the spacer-nail, and the shorter portion having rigid means fixed on the spacer-nail and adapted to retain a portion of a reticulated or other element within the bight of the spacer-nail in spaced relation to the support or other member thereat.

12. A spacer-nail comprising oppositely disposed and rigid portions of unequal lengths connected together at the head of the spacer-nail by a connecting portion so as to form a staple-like member, the longer portion being substantially in alignment with the head and adapted to penetrate a support and constituting a pointed drive shank, an immovable projection intermediate on the pointed drive shank and adapted to limit the penetration of the spacer-nail, the shorter portion or other shank being of a length less than the length of the pointed drive shank between the portion connecting together the shanks and the under-side of the aforesaid projection, and one of the shanks having a shoulder adapted to retain a portion of a reticulated or other element within the bight of the spacer-nail in spaced relation to the support or other member thereat.

13. A spacer-nail comprising oppositely disposed and rigid shanks connected together at the head of the spacer-nail by a connecting portion so as to form a staple-like member, the spacer-nail being adapted to penetrate a support, an immovable projection intermediate on one of the shanks and substantially in alignment with the head and adapted to limit the penetration of the spacer-nail, and the other shank having a shoulder adapted to retain a portion of a reticulated or other element within the bight of the spacer-nail in spaced relation to the support or other member thereat.

14. A spacer-nail comprising oppositely disposed and rigid portions of unequal lengths connected together at the head of the spacer-nail by a connecting portion so as to form a staple-like member, the longer portion being substantially in alignment with the head and adapted to penetrate a support and constituting a pointed drive shank, immovable means intermediate on the pointed drive shank and adapted to limit the penetration of the spacer-nail, the pointed drive shank having a twisted cutting that will cause the spacer-nail to rotate about the axis of the pointed drive shank when being driven, and rigid means fixed on the spacer-nail and adapted to retain a portion of a reticulated or other element within the bight of the spacer-nail in spaced relation to the support or other member thereat.

ELMORE WILLIAM MENNINGER.